April 9, 1929.  J. APPLETON  1,708,822
PORTABLE METAL WORKING MACHINE
Original Filed April 11, 1922  4 Sheets-Sheet 4

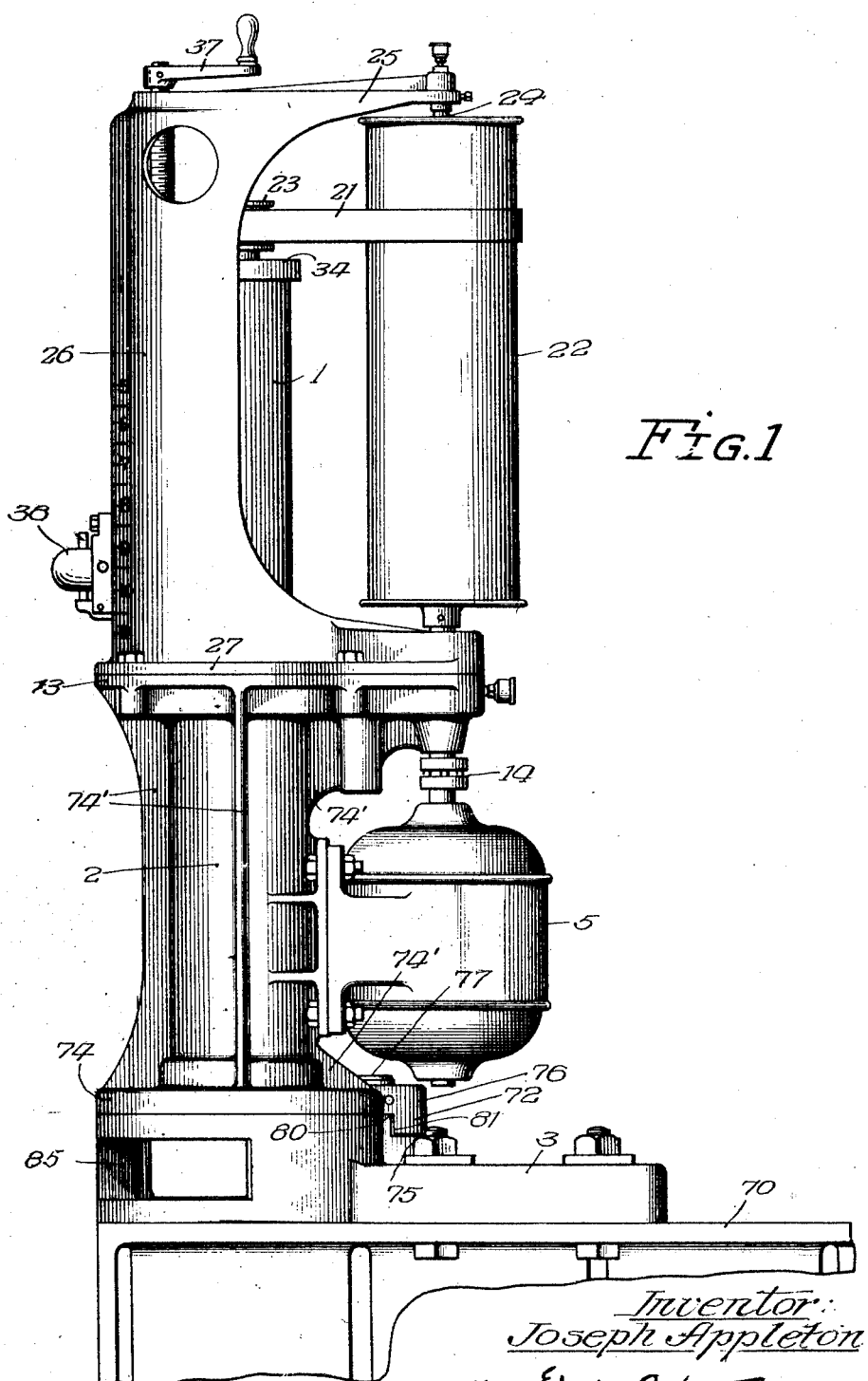

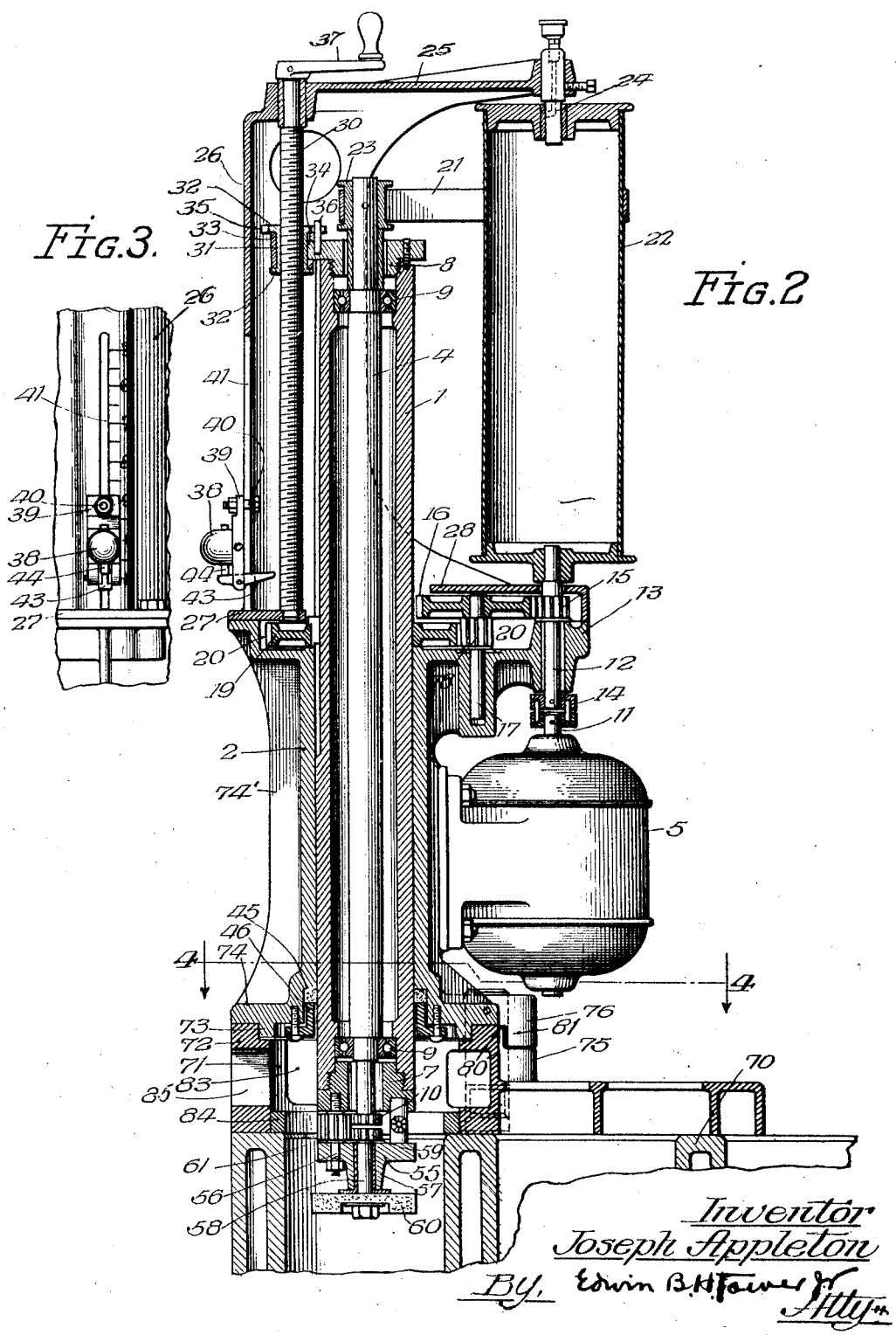

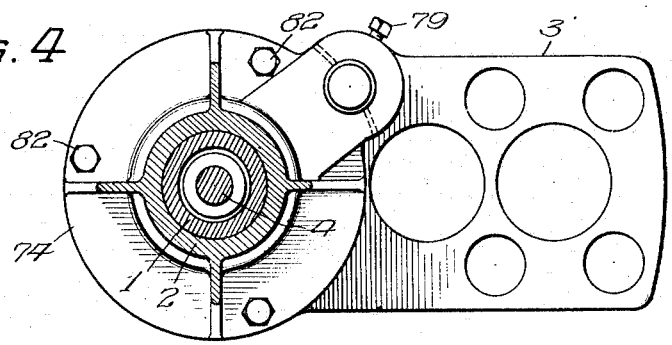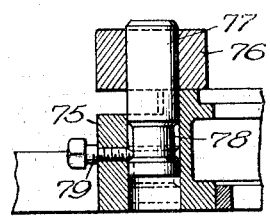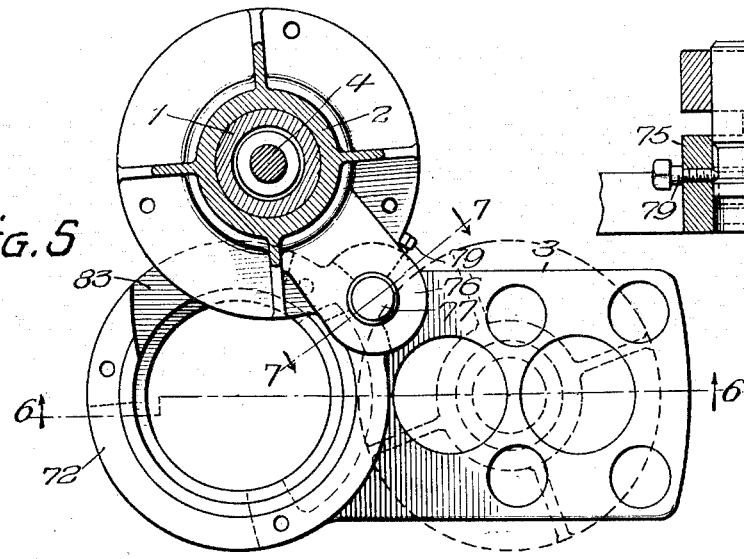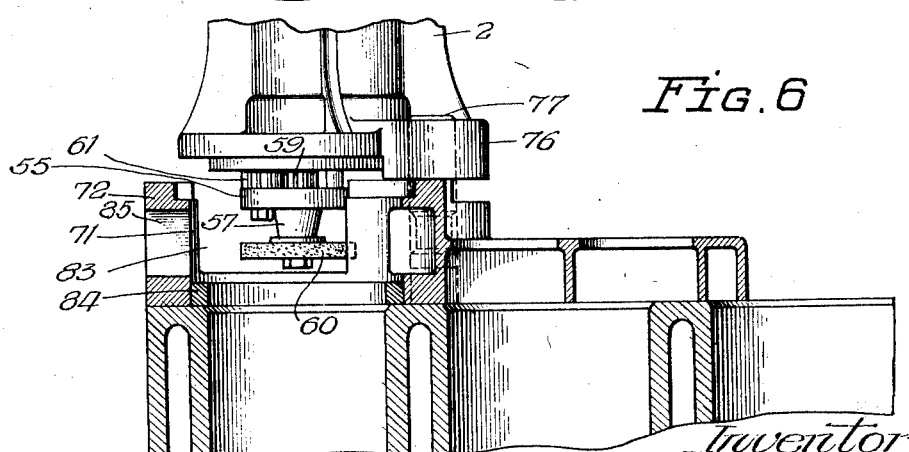

Inventor
Joseph Appleton
By Edwin B. H. Tower Jr.
Atty.

Patented Apr. 9, 1929.

1,708,822

UNITED STATES PATENT OFFICE.

JOSEPH APPLETON, OF PORT WASHINGTON, WISCONSIN, ASSIGNOR, BY MESNE ASSIGNMENTS, TO SIMPLICITY ENGINE & MANUFACTURING COMPANY, OF PORT WASHINGTON, WISCONSIN, A CORPORATION OF WISCONSIN.

PORTABLE METAL-WORKING MACHINE.

Application filed April 11, 1922, Serial No. 551,714. Renewed January 17, 1929.

This invention relates to a metal working machine.

The machine to which the invention applies in particular is a boring and grinding machine such as the one disclosed in the copending application of Nels A. Nelson, Serial Number 540,567, filed March 2, 1922.

An object of the invention is to provide a machine having simple and compact driving mechanism.

Another object is to provide an automatically operated control to stop the machine at a predetermined limit.

Another object is to provide a machine arranged to facilitate the removal or attachment of the boring and grinding tools.

Another object is to provide a machine which may be readily adjusted and operated.

Another object is to provide a machine which is light, compact and durable.

Another object is to provide a machine which may be readily and economically manufactured.

Other objects of the invention will appear hereinafter.

The accompanying drawings illustrate a machine made in accordance with the invention and the views therein are as follows:

Fig. 1 is a side elevation of a portable metal working machine arranged on a cylinder block.

Fig. 2 is a vertical section through the machine showing the grinding tool in place and partially advanced into a cylinder.

Fig. 3 is a side elevation of the automatic control switch.

Fig. 4 is a sectional plan on the line 4—4 of Fig. 2.

Fig. 5 is a view similar to Fig. 4 showing the bearing standard swung to one side.

Fig. 6 is a vertical section on the line 6—6 of Fig. 5.

Fig. 7 is a vertical section on the line 7—7 of Fig. 5.

Figure 8:
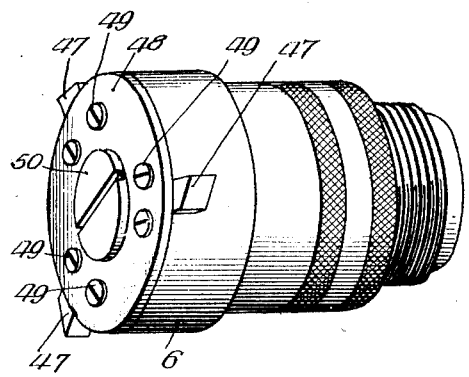
Fig. 8 is a perspective view of the boring tool.

The machine has a main outer tool shaft 1 rotatable and axially movable in a vertical bearing standard 2 which is pivotally arranged on a horizontal base 3.

An inner tool shaft 4 is rotatably mounted in shaft 1 and axially movable therewith.

The shafts are driven by an electric motor 5 which is mounted on the bearing standard.

The outer shaft may carry either a boring tool 6 or a grinding tool 7 at its lower end.

The upper end of the outer shaft is provided with a flanged cap 8 which cooperates with feeding and supporting mechanism to control the axial movement of the shafts.

The inner shaft is rotatably mounted in ball bearings 9 arranged near the ends of shaft 1 and extends upwardly through cap 8.

A gear 10 is arranged on the lower end of the shaft 4 to drive the grinding tool.

The inner shaft and gear 10 perform no useful function when the boring tool is attached to the outer shaft.

The driving motor has its shaft 11 arranged substantially parallel to the outer shaft.

The motor shaft is connected to a vertical driving shaft 12 journaled in a bracket 13 formed on the bearing standard.

Shafts 11 and 12 are connected by a flexible coupling 14 to prevent binding of either shaft.

A pinion 15 on shaft 12 meshes with a gear 16 fixed on a counter shaft 17 which is also journaled in bracket 13.

A pinion 18 is fixed on shaft 17 and meshes with a gear 19 splined to shaft 1, thus providing a positive drive between the motor and shaft 1.

Gears 18 and 19 are arranged in a recess 20 provided in the top of the bearing standard and bracket.

Inner shaft 4 is driven by a belt 21 which connects an elongated driving pulley 22 to a pulley 23 fixed on the upper end of inner shaft 4.

Pulley 22 is elongated so that belt 21 may move longitudinally thereof as shaft 4 moves axially.

The lower end of pulley 22 is fixed to shaft 12 and its upper end is mounted on a stub shaft 24 carried by the top 25 of the upper frame 26.

Frame 26 has a base 27 which rests upon the top of the bearing standard and holds gear 19 against upward movement.

Base 27 and a plate 28 extend over recess 20 to protect the gears therein and upper frame 26 substantially encloses the feeding mechanism.

A feed screw 30 is arranged in the upper casing parallel to the outer shaft and journaled in the top 25 and base 27 of the upper frame.

A traveling nut 31 is threaded on the feed screw and is provided with upper and lower flanges 32.

The traveling nut supports a bearing member 33 between the upper and lower flanges 32 and is rotatable relatively thereto.

The bearing member 33 engages a flange 34 on the cap 8 to support shaft 1 and to move the same axially with the traveling nut, as more fully set forth in the copending application referred to above.

The upper flange of the nut has peripheral teeth 35 which are engaged by one or more pins 36 carried by the cap 8.

When the outer shaft and cap are rotated, pin 36 successively engages the teeth on the upper flange of the traveling nut to cause the latter to turn a predetermined amount during each revolution of the outer shaft, thus automatically feeding the tool into the cylinder.

When the machine is in operation, the feed screw remains stationary but, when the tool is to be withdrawn from the cylinder, the nut remains stationary and the feed screw is manually rotated by a hand crank 37 mounted on its upper end.

The machine has an automatic control comprising an electric switch 38 suitably connected to open the motor circuit and cooperating with the feeding mechanism to stop the motor when the tool has been advanced a predetermined distance into the cylinder.

The switch is arranged on an insulating base 39 and clamped in adjusted position on the upper frame 26 by a bolt 40 which extends through a vertical slot 41 in the upper frame.

The upper frame may be graduated adjacent the slot to facilitate in the accurate adjustment of the control mechanism and to indicate the depth to which any given position of the control switch will allow the tool to be advanced.

The control mechanism for the switch includes a trip lever 43 pivoted upon the base 39 and engaging a switch actuating arm 44 which is in engagement with switch 38.

The trip lever extends through slot 41 and into the upper frame to a position near the feed screw 30 and in the path of the downward movement of the traveling nut. When the tool has been advanced a predetermined distance, the traveling nut engages the trip lever which actuates the switch arm to open the switch and break the motor circuit and thereby stop the machine.

The bearing surfaces of the outer shaft 70 and bearing standard may be protected from dirt and other deleterious matter by a felt washer 45 secured in the lower end of the bearing standard by a flanged packing ring 46 fastened to the base of the bearing standard.

Figure 9:
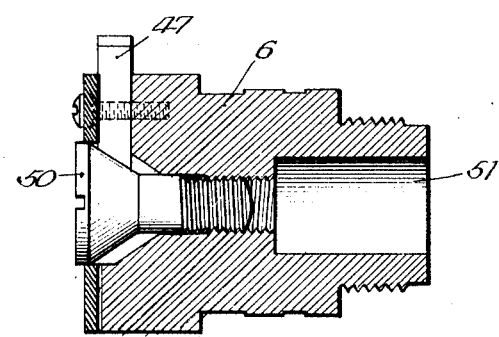
Fig. 9 is a longitudinal section through the boring tool.
Figure 10:
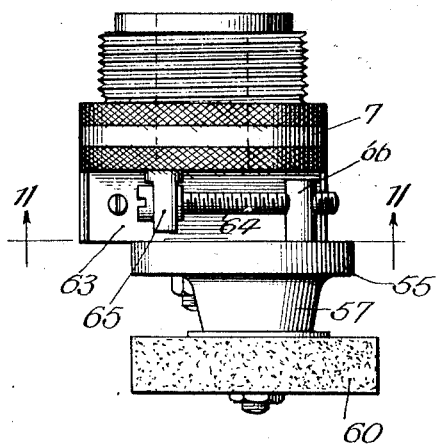
Fig. 10 is a side elevation of the grinding tool.
Figure 11:
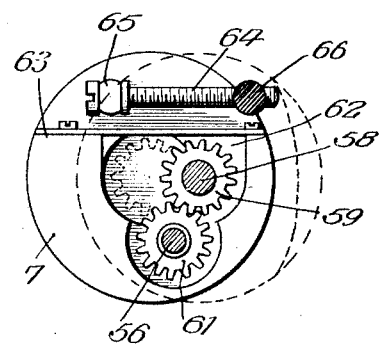
Fig. 11 is a horizontal section on the line 11—11 of Fig. 10.

The boring tool 6, shown in Figs. 8 and 9, has a plurality of evenly spaced radially disposed slots in its lower end and a cutter 47 arranged in each slot and clamped therein by a clamping plate 48 and screws 49.

The inner ends of the cutters are beveled to cooperate with the beveled head of an adjusting screw 50 by means of which the cutters may be adjusted.

The upper end of the boring tool is externally threaded to screw into the lower end of the outer tool shaft and has an axial opening 51 to receive the gear 10 and the lower end of inner shaft 4.

The grinding tool 7 has a threaded extension concentric with its body for engaging the internally threaded lower end of shaft 1.

A bearing disk 55 is pivotally connected to the tool body and held in spaced relation thereto by a shouldered stud 56.

Bearing disk 55 is provided with a vertical bearing hub 57 in which a tool spindle 58 is rotatably mounted.

The tool spindle has a gear 59 on its upper end and a grinding wheel 60 on its lower end.

The grinding wheel is driven by a gear train comprising the driving gear 10 on inner shaft 4, an idler gear 61 rotatable on stud 56 and the gear 59 on the tool spindle.

The gears are arranged in a recess 62 formed in the lower part of the tool body and enclosed therein by a protecting plate 63.

The bearing disk is pivotally adjusted on the stud 56 by an adjusting screw 64.

A lug 65 is carried by the tool body and a lug 66 is carried by the bearing disk.

The adjusting screw is rotatable in lug 65 and held against axial movement thereby and is threaded through lug 66 to hold the bearing disk in adjusted positions eccentric to the grinding tool body.

Rotation of the outer shaft imparts a planetary movement to the grinding wheel and causes it to travel around the wall of the cylinder while the inner shaft rotates the grinding wheel at high speed to grind the cylinder wall.

The horizontal base 3 of the machine is adapted to be fastened on an engine cylinder block 70 and has a vertical opening 71 to be positioned above and concentric with the cylinder to be machined.

The base has a flange 72 extending upwardly around the opening 71 to provide a seat for the bearing standard.

Flange 72 is counterbored to receive an annular shoulder 73 extending downwardly from a flange 74 which forms the base of the bearing standard and seats upon the top of flange 72.

Shoulder 73 positions the bearing standard concentric with opening 71.

The bearing standard may be provided with vertical strengthening webs 74'.

The standard is pivotally connected to the base by means of lugs 75 and 76 arranged on the base and standard, respectively, and a vertical pivot pin 77 connecting the lugs.

The pivot pin has a peripheral groove 78 to receive the inner end of a screw 79 which limits the vertical movement of the pin and thereby prevents separation of the standard and the base.

The pivot pin is arranged to move vertically to allow the bearing standard to be raised to clear shoulder 73 above the base flange 72.

The lugs 75 and 76 have cooperating shoulders 80 and 81, respectively, for supporting the bearing standard in its raised position after it has been swung on the pivot pin.

When the machine is in operation, the standard may be fastened to the base by bolts 82.

When the boring is finished and the boring tool is to be replaced by a grinding tool, the outer shaft is raised to its upper limit and the bolts 82 removed.

The standard is then raised and pivoted clock-wise on the pin 77.

The tool passes through a lateral opening or passageway 83 in the base flange 72 and is then in a position which allows its ready removal.

The opening 71 is adapted to receive a gauge ring 84 the internal diameter of which represents the size to which the cylinder is to be machined.

The tools may be inspected and adjusted through the lateral opening 83 or through an additional opening 85 in the base.

The invention herein set forth is susceptible of other modifications and adaptations.

The invention claimed is:

1. A metal working machine comprising an outer shaft having independent rotary and axial movements, a rotary inner shaft arranged in said outer shaft to drive a tool and movable axially with said outer shaft, a motor to drive said shafts having its shaft parallel to said outer shaft, a drive connecting said outer shaft and said motor shaft, a rotary driver connected to said motor shaft in axial alinement therewith, and an inner shaft drive connecting said inner shaft and said driver and movable with said inner shaft along said driver.

2. A metal working machine comprising a base, a bearing standard carried by said base, an outer shaft arranged in said bearing standard to have independent rotary and axial movements therein, an electric motor carried by said standard and having its shaft parallel to said outer shaft, a drive connecting said outer shaft and said motor shaft, a rotary inner shaft arranged in said outer shaft to drive a tool and movable axially with said outer shaft, a rotary driver connected to said motor shaft in axial alinement therewith, and an inner shaft drive connecting said inner shaft and said driver and movable with said inner shaft along said driver.

3. A metal working machine comprising a portable frame, an outer shaft arranged vertically in said frame to have independent rotary and axial movements therein, a gear slidably keyed on said outer shaft and held against axial movement by said frame, an electric motor carried by said frame and having its shaft parallel to said outer shaft, a drive connecting said motor shaft and said gear to rotate said outer shaft, a rotary inner shaft arranged in said outer shaft to drive a tool and movable axially with said outer shaft, a rotary driver connected to said motor shaft in axial alinement therewith, and an inner shaft drive connecting said inner shaft and said driver and movable with said inner shaft along said driver.

4. A metal working machine comprising an outer shaft having independent rotary and axial movements, a drive to rotate said outer shaft, an independently rotatable inner shaft arranged in said outer shaft to drive a tool and movable axially with said outer shaft, a rotary driver arranged parallel to said outer shaft, an inner shaft drive connecting said inner shaft and said driver and movable with said inner shaft along said driver, means to move said shafts axially, and means to limit automatically the axial movements of said shafts.

5. A metal working machine comprising an outer shaft having independent rotary and axial movements and arranged to carry a tool, an electric motor to drive said shaft, an independently rotatable inner shaft arranged in said outer shaft to drive a tool and movable axially with said outer shaft, an inner shaft drive driven by said motor and movable with said inner shaft, means to move said shafts axially, an electric switch connected in circuit with said motor, and means automatically actuated by the axial movement of said shafts to operate said switch.

6. A metal working machine comprising an outer shaft having independent rotary and axial movements and arranged to carry a tool, an electric motor to drive said shaft, an independently rotatable inner shaft arranged in said outer shaft to drive a tool and movable axially with said outer shaft, a rotary driver arranged parallel to said outer shaft and driven by said motor, an inner shaft drive connecting said inner shaft and said driver and movable with said inner shaft along said driver, means to move said shafts axially, an electric switch connected in circuit with said motor, and means automatically actuated by the axial movement of said shafts to operate said switch.

7. A metal working machine comprising a frame, an outer shaft rotatably and slidably mounted in said frame, an electric motor arranged on said frame to drive said outer shaft, an independently rotatable inner shaft arranged in said outer shaft to drive a tool and movable axially with said outer shaft, a rotary driver arranged in said frame parallel to said outer shaft and driven by said motor, an inner shaft drive connecting said inner shaft and said driver and movable with said inner shaft along said driver, means to move said shafts axially, an electric switch connected in circuit with said motor, and means automatically actuated by the axial movement of said shafts to operate said switch.

8. A metal working machine comprising an outer shaft having independent rotary and axial movements and arranged to carry a tool, a rotary inner shaft arranged in said outer shaft to drive a tool and movable axially with said outer shaft, a motor to drive said shafts having its shaft parallel to said outer shaft, a drive connecting said outer shaft and said motor shaft, a rotary driver connected to said motor shaft in axial alinement therewith, an inner shaft drive connecting said inner shaft and said driver and movable with said inner shaft along said driver, means to move said inner and outer shafts axially, and means to automatically limit the axial movement of said inner and outer shafts.

9. A metal working machine comprising a frame, an outer shaft rotatably and slidably mounted in said frame, an electric motor arranged on said frame to drive said outer shaft, an independently rotatable inner shaft arranged in said outer shaft to drive a tool and movable axially with said outer shaft, a rotary driver arranged in said frame parallel to said outer shaft and driven by said motor, an inner shaft drive connecting said inner shaft and said driver and movable with said inner shaft along said driver, a shaft support connected to said outer shaft to support the same, a feed screw threaded through said shaft support to support the same and to move it axially, an electric switch connected in circuit with said motor, and an actuator to operate said switch extending into the path of said shaft support.

10. A metal working machine comprising a frame, an outer shaft rotatably and slidably arranged in said frame, an independently rotatable inner shaft arranged in said outer shaft to drive a tool and movable axially with said outer shaft, a motor arranged on said frame, drives connecting said shafts to said motor to rotate said shafts at different speeds, a feed screw arranged in said frame alongside said outer shaft, a shaft support threaded on said feed screw and connected to said outer shaft to support the same, means to move said shaft support along said feed screw, an electric switch arranged on said frame and connected in circuit with said motor, and an actuator to operate said switch extending into the path of said shaft support.

11. A metal working machine comprising a frame, an outer shaft rotatably and slidably arranged in said frame, an independently rotatable inner shaft arranged in said outer shaft to drive a tool and movable axially with said outer shaft, a motor arranged on said frame, drives connecting said shafts to said motor to rotate said shafts at different speeds, a feed screw arranged in said frame alongside said outer shaft, a nut threaded on said feed screw and connected to said outer shaft to support the same, means to rotate said nut and move the same along said feed screw, an electric switch arranged on said frame and connected in circuit with said motor, and a lever pivoted on the frame and arranged to be engaged by said nut and operate said switch to stop said motor.

12. A metal working machine comprising a frame having a slot, an outer shaft rotatably and slidably arranged in said frame, an independently rotatable inner shaft arranged in said outer shaft to drive a tool and movable axially with said outer shaft, a motor arranged on said frame, drives connecting said shafts to said motor to rotate said shafts at different speeds, a feed screw arranged in said frame alongside said outer shaft in alinement with said slot, a nut threaded on said feed screw and connected to said outer shaft to support the same, means to rotate said nut and move the same along said feed screw, an electric switch arranged on said frame and connected in circuit with said motor, and a lever pivoted on the frame and extending through said slot to be engaged by said nut and operate said switch to stop said motor.

13. A metal working machine comprising a base, a bearing standard arranged on said base and pivotally connected thereto, an outer shaft arranged in said standard, an inner shaft arranged in said outer shaft to drive a tool, drives to rotate said shafts simultaneously and at different speeds, and means to move said shafts axially.

14. A metal working machine comprising a base, a bearing standard arranged on said base and pivotally connected thereto, an outer shaft arranged in said standard, an inner shaft arranged in said outer shaft to drive a tool, drives to rotate said shafts simultaneously and at different speeds, and means arranged alongside and parallel to said outer shaft to move said shafts axially.

15. A metal working machine comprising a base, a bearing standard arranged on said base and pivotally connected thereto, a rotatable and axially movable outer shaft arranged in said standard, a drive to rotate said outer shaft, an inner shaft arranged in said outer shaft to move axially therewith, a rotary driver arranged alongside said outer shaft, and an inner shaft drive connecting said inner shaft and said driver and movable with said inner shaft along said driver.

16. A metal working machine comprising a base, a bearing standard arranged on said base and pivotally connected thereto, a rotatable and axially movable outer shaft arranged in said standard, an electric motor arranged on said standard and having its shaft parallel to said outer shaft, a drive to rotate said outer shaft driven by said motor, an inner shaft arranged in said outer shaft to move axially therewith, a rotary driver connected to said motor shaft in axial alinement therewith, and an inner shaft drive connecting said inner shaft and said driver and movable with said inner shaft along said driver.

17. A metal working machine comprising a base having a vertical opening therethrough for alinement with a cylinder and a passageway intersecting said opening to permit the passage of a tool laterally from said opening, a bearing standard pivotally connected to said base in alinement with said opening, an outer shaft arranged in said standard to have rotary and axial movements therein, a rotary inner shaft arranged in said outer shaft to drive a tool and to move axially with said outer shaft, drives to rotate said shafts simultaneously and at different speeds, and means to move said shafts axially.

18. A metal working machine comprising a base having a vertical opening therethrough for alinement with a cylinder, a flange surrounding said opening and having a passageway intersecting said opening to permit the passage of a tool laterally therefrom, a bearing standard pivotally connected to said base, a flange carried by said standard to co-act with the flange on said base to fix said standard in alinement with said opening, an outer shaft arranged in said standard to have rotary and axial movements therein, a rotary inner shaft arranged in said outer shaft to drive a tool and to move axially with said outer shaft, drives to rotate said shafts simultaneously and at different speeds, and means to move said shafts axially.

19. A metal working machine comprising a base having a vertical opening therethrough for alinement with a cylinder and a passageway intersecting said opening to permit the passage of a tool laterally from said opening, a bearing standard arranged on said base in alinement with said opening, an outer shaft arranged in said standard to have rotary and axial movements therein, a rotary inner shaft arranged in said outer shaft to drive a tool and to move axially with said outer shaft, drives to rotate said shafts simultaneously and at different speeds, means to move said shafts axially, a lug carried by said standard, and a pivot pin connecting said lug to said base to permit said standard to be pivoted thereon.

20. A metal working machine comprising a base having a vertical opening therethrough for alinement with a cylinder and a passageway intersecting said opening to permit the passage of a tool laterally from said opening, a bearing standard arranged on said base in alinement with said opening, an outer shaft arranged in said standard to have rotary and axial movements therein, a rotary inner shaft arranged in said outer shaft to drive a tool and to move axially with said outer shaft, drives to rotate said shafts simultaneously and at different speeds, means to move said shafts axially, a lug carried by said standard, a pivot pin connecting said lug to said base to permit said standard to be pivoted thereon, and shoulders on said lug and said base co-acting with each other to support said standard a predetermined distance above said base after being swung out of alinement with said opening.

In witness whereof, I have hereunto subscribed my name.

JOSEPH APPLETON.